United States Patent [19]

Kido

[11] Patent Number: 5,067,034
[45] Date of Patent: Nov. 19, 1991

[54] TAPE RECORDER HAVING A BASE PLATE COMPRISED OF A SYNTHETIC MAIN PLATE HELD BETWEEN AND INTEGRAL WITH TWO AUXILIARY PLATES MADE OF A METAL MATERIAL

[75] Inventor: Kunio Kido, Wako, Japan

[73] Assignee: Tanashin Denki Co., Ltd., Tokyo, Japan

[21] Appl. No.: 321,177

[22] Filed: Mar. 9, 1989

[30] Foreign Application Priority Data

Jun. 15, 1988 [JP] Japan ............................. 63-79327[U]
Oct. 27, 1988 [JP] Japan ............................. 63-140807[U]
Nov. 22, 1988 [JP] Japan ............................. 63-152895[U]

[51] Int. Cl.$^5$ ............................................ G11B 15/48
[52] U.S. Cl. ................................. 360/74.1; 360/137; 360/96.3
[58] Field of Search .................. 360/96.2, 96.3, 96.1, 360/88, 90, 93, 137, 74.1, 71, 73.1, 73.05, 73.04; 242/197, 199

[56] References Cited

U.S. PATENT DOCUMENTS

| | | | |
|---|---|---|---|
| 4,408,237 | 10/1983 | Takahashi et al. | 360/96.3 |
| 4,445,159 | 4/1984 | Nemoto et al. | 360/93 X |
| 4,760,479 | 7/1988 | Suzuki et al. | 360/93 X |
| 4,827,363 | 5/1989 | Takashima et al. | 360/96.1 |
| 4,839,759 | 6/1989 | Ida et al. | 360/96.1 X |

Primary Examiner—Aristotelis Psitos
Assistant Examiner—Andrew L. Sniezek
Attorney, Agent, or Firm—Wegner, Cantor, Mueller & Player

[57] ABSTRACT

A tape recorder which includes an improved rotary member supporting device, reel receiver mounting mechanism and a base plate. The supporting device includes a base plate having an integral tubular body surrounding a hub portion of a rotary member, and a conical recess is formed at the center of a bottom wall of the tubular body. The reel receiver mounting mechanism include a metal shaft having a groove and a head formed at the opposite ends thereof, and the base plate has a cylindrical portion in which the metal shaft is securely fitted with a coming off preventing member engaged in the groove. The base plate include a main synthetic resin plate held between and integrated with first and second auxiliary metal plates. Pairs of spacings for various tape recorder components are formed in the main plate while several support shafts are provided on the first auxiliary plate and several plate-formed operating levers are disposed between the main and second auxiliary plates.

2 Claims, 10 Drawing Sheets

TAPE RECORDER HAVING A BASE PLATE COMPRISED OF A SYNTHETIC MAIN PLATE HELD BETWEEN AND INTEGRAL WITH TWO AUXILIARY PLATES MADE OF A METAL MATERIAL

BACKGROUND OF THE INVENTION

1) Field of the Invention

This invention relates to a tape recorder, and more particularly to improvements in or relating to a tape recorder of the type which includes a rotary member supporting device for supporting a rotary member such as an idler pulley for rotation on a base plate, or a reel receiver mounting mechanism wherein a metal shaft for mounting a reel receiver thereon is supported on a base plate of a synthetic resin material.

2) Description of the Prior Art

A tape recorder normally includes one or more rotary members such as, for example, a pulley and a rotary member supporting device for supporting the rotary member for rotation thereon. Such a rotary member supporting device as shown in FIG. 15 is already known wherein a rotary member a such as a pulley of a tape recorder is supported for rotation on a base plate d made of a synthetic resin material by means of a support shaft f. The support shaft f has an end press fitted in and secured to a shaft fitting hole e formed in the base plate d. The support shaft f is fitted in a center bore c formed in a hub b which is provided projectingly at the center of an axial end face of the rotary member a.

In order to reduce a load to the rotary member against rotation arising from friction between the rotary member a and the support shaft f in the rotary member supporting device, the support shaft f should be reduced in diametrical dimension.

With the rotary member supporting device, however, it is difficult in designing to make the support shaft f very thin because a load applied to the rotary member a is supported only by the support shaft f. If the support shaft f is made excessively thin, then sufficient strength is not assured so that the support shaft f may be bent or deformed when, for example, the support shaft f is press fitted into the shaft fitting hole e or the rotary member a is assembled to the support shaft f, or when an unexpectedly great load is applied to the support shaft f during transportation or the like of the tape recorder, or else when a lateral pressure acts upon the rotary member a.

Meanwhile, even if lubricant such as grease is applied to the support shaft f, such lubricant is partially scraped off when the rotary member a is assembled to the support shaft f. Accordingly, it is difficult to effectively reduce friction between the rotary member a and the support shaft f. Furthermore, as the support shaft f is reduced in thickness and increased in axial length, it becomes more difficult for lubricant to penetrate between the support shaft f and the center bore c of the hub b. Means for resolving the difficulty is thus expected. Besides, dust readily sticks to lubricant on an outer periphery of the support shaft, and there is the possibility that such dust may enter between the support shaft f and the center bore c of the hub b to cause a seizure of the rotary member a or the support shaft f. It is to be noted that reference symbol g in FIG. 15 denotes a member for preventing coming off of the rotary member 1 in a axial direction from the shaft f.

On the other hand, a cassette tape recorder normally includes a reel receiver mounting mechanism for mounting a reel receiver thereon. Such a reel receiver mounting mechanism as shown in FIG. 16 is already known wherein a reel receiver j is mounted for rotation on a metal shaft i and retained in position in an axial direction by means of a washer m. In particular, the metal shaft i is secured at an end thereof to a base plate h formed from a metal plate, and the reel receiver j is fitted for rotation on the metal shaft i. The metal shaft i has an annular groove k formed at the other end portion thereof, and the washer m serving as a coming off preventing member is engaged in the annular groove k of the metal shaft i.

With such a reel receiver mounting mechanism, the metal shaft i is secured at the end thereof to the base plate h normally by "caulking".

Such securing operation by "caulking", however, requires a press fitting device and a crashing device because the securing operation proceeds such that the end portion of the metal shaft i is press fitted into a hole n perforated in advance in the base plate h, and then the end portion of the metal shaft i is crashed on the reverse face side of the base plate h. Besides, it is necessary to assure several dimensions of the metal shaft i and the hole n perforated in the base plate h with a high degree of accuracy.

Meanwhile, in some conventional tape recorders, a base plate is entirely or partly made of a synthetic resin material and a metal shaft is secured at an end portion thereof to the synthetic resin base plate. Also in order to produce such tape recorders, however, it is necessary to use a press fitting device. Besides, where a fitting distance between such base plate and metal shaft is so great that a great press fitting force is required, there is the possibility that the synthetic resin base plate may be damaged. On the contrary, where such fitting distance is very small, only a small press fitting force is required, but reliable fixation cannot be attained.

Accordingly, a higher degree of accuracy in working is required for individual dimensions of a metal shaft and a hole perforated in a base plate made of a synthetic resin material than for dimensions of a base plate formed from a metal plate, resulting in a high production cost.

Further, while conventional cassette tape recorders have various functions such as an automatic reversing function and an automatic stopping function, further miniaturization and reduction in weight is called for such cassette tape recorders in recent years. Accordingly, a cassette tape recorder mechanism is required to meet two apparently inconsistent requirements of improvement in function and of miniaturization and reduction in weight.

In the meantime, as mentioned hereinabove, a base plate for a tape recorder is conventionally formed from a metal plate or from a synthetic resin plate or else from a metal plate and a synthetic resin plate mounted on an upper face of part of the metal plate.

Where a base plate is formed from a metal plate, various support shafts for supporting rotary or pivotal members for rotation or pivotal motion thereon must be mounted on the base plate by caulking or by means of a fastening screw. Accordingly, considerable numbers of parts and man-hours for production are required.

To the contrary, where a base plate is formed from a synthetic resin plate, there is an advantage that parts and man-hours for production can be reduced in number because all shafts or like parts can be formed in an integral relationship with the base plate. It is, however, disadvantageous for reduction of the thickness of an entire tape recorder in that the base plate must have a sufficiently great thickness to compensate for its mechanically low strength.

Where a base plate is formed from a metal plate and a synthetic resin plate mounted on an upper face of part of the metal plate, it has both of the advantages and disadvantages of the two base plates half and half. Thus, while numbers of parts and man-hours for production can be reduced to some degree, such reduction is still insufficient to attain satisfactory reduction in overall thickness of a tape recorder.

Particularly with an automatic reversing tape recorder, because the tape recorder includes a large number of movable parts, reduction in overall thickness is further difficult in spite of such a measure that a plurality of base plates are disposed in a parallel, spaced relationship from each other so as to increase an area in which parts are to be mounted.

SUMMARY OF THE INVENTION

It is an object of the present invention to provide a rotary member supporting device wherein deformation of a support shaft is readily prevented even where the support shaft has a comparatively small diameter and a comparatively great axial dimension.

It is another object of the present invention to provide a rotary member supporting device wherein lubricant can penetrate sufficiently between a support shaft and a center bore formed in a rotary member to permit reduction in load to the rotary member against rotation of the rotary member and which can prevent dust from entering between the support shaft and the center bore.

It is a further object of the present invention to provide a reel receiver mounting mechanism for a cassette tape recorder which facilitates assembly of a metal shaft to a synthetic resin base plate and can readily attain reduction in overall size and weight and also in production cost of the tape recorder.

It is a still further object of the present invention to provide a base plate for an automatic reversing tape recorder which can attain reduction in number of components and man-hours for production of the tape recorder and also in overall thickness of the tape recorder.

In order to attain the objects, according to one aspect of the present invention, there is provided a rotary member supporting device wherein a support shaft having an end press fitted in and secured to a shaft fitting hole formed in a base plate made of a synthetic resin material is fitted in a center bore of a hub portion provided projectingly at the center of an axial end face of a rotary member to support the rotary member for rotation on the base plate, characterized in that the base plate has a tubular body formed in an integral relationship thereon in such a manner as to surround the hub portion of the rotary member, and a conical recess is formed at the center of a bottom wall of the tubular body.

With the rotary member supporting device, even if the rotary member is acted upon by a lateral pressure, possible deformation of the support shaft is prevented by the tubular body. Further, press fitting of the support shaft into the shaft fitting hole is made easy because the conical recess serves as a guide, and consequently, it becomes easy to design the support shaft with a reduced thickness or diameter and an increased axial length. Meanwhile, when the rotary member is assembled to the support shaft to which lubricant is applied, the lubricant will be scraped off and received in the conical recess and the thus received lubricant will gradually penetrate between the support shaft and the center bore of the hub portion as the rotary member rotates.

Where the hub portion of the rotary member has an enlarged bore portion of a greater diameter formed at a central portion of an end thereof in a contiguous relationship to the center bore, the lubricant scraped off from the support shaft is also received in the enlarged bore portion of the hub portion and will generally penetrate between the support shaft and the center bore of the hub portion as the rotary member rotates.

The tubular body may be a lubricant retaining portion of a greater diameter formed in an inner wall at an end portion thereof. The lubricant which tends to leak to the outside through a gap between the hub portion and the tubular body is thus received in the lubricant retaining portion at the end portion of the tubular body. Accordingly, unless lubricant is supplied very excessively, it will not leak to the outside.

According to another aspect of the present invention, there is provided a reel receiver mounting mechanism for a cassette tape recorder wherein a reel receiver for engaging with a reel hub of a tape cassette is mounted for rotation on a metal shaft which is supported at an end portion thereof for rotation on a base plate made of a synthetic resin material, characterized in that the metal shaft has a coming off preventing member fitting groove formed at an end portion thereof and a coming off preventing head of a greater diameter formed at the other end portion thereof while the base plate has a cylindrical shaft supporting portion formed projectingly in an integral relationship on the reverse side thereof, and the one end portion of the metal shaft is fitted in and supported by the shaft supporting portion with a coming off preventing member engaged in the coming off preventing member fitting groove of the metal shaft, thereby preventing coming off of the metal shaft from the shaft supporting portion of the base plate.

With the reel receiver mounting mechanism, since the one end portion of the metal shaft is fitted in and supported by the shaft supporting portion with the coming off preventing member engaged in the coming off preventing member fitting groove of the metal shaft to prevent coming off of the metal shaft from the shaft supporting portion of the base plate, the necessity of use of a press fitting device or a crashing device which is conventionally used to assemble a reel receiver mounting mechanism is eliminated. Besides, the accuracy in dimension of various portions of the metal shaft and a hole to be formed in the base plate is moderated.

Preferably, the coming off preventing member is a resilient piece formed in an integral relationship on the shaft supporting portion of the base plate. Such resilient piece facilitates engaging operation between the coming off preventing member and the coming off preventing member fitting groove of the metal shaft and also facilitates formation of the coming off preventing member.

Preferably, upper faces of a tape feeding motor and a reel base which is provided at a base portion of the reel receiver are positioned substantially in flush with an upper face of the base plate, and the shaft supporting portion and various parts provided for transmission of rotation from the tape feeding motor are disposed on the base plate substantially within the range of an axial dimension of the tape feeding motor. The arrangement does not provide a disadvantage that the overall thickness of the tape recorder may be increased in spite of provision of the shaft supporting portion. The arrangement further enables such designing that a tape cassette may be located in an overlapping relationship above the motor, and consequently, the motor can be disposed near the reel receiver and the tape recorder can be reduced in side.

Where the base plate has a bottomed cylindrical recessed portion formed thereon for accommodating the reel base, a rotation transmitting gear coaxial with the reel base and a rotation detecting member and the shaft supporting portion of the base plate is formed in a contiguous relationship to a bottom wall of the bottomed cylindrical recessed portion, the tape recorder can be produced with a minimized thickness or height.

According to a further aspect of the present invention, there is provided a base plate for an automatic reversing tape recorder on which a pair of reel receivers each having a reel gear provided at a lower end portion thereof, a pair of capstans, a pair of pinch roller supporting members each having a pinch roller supported for rotation thereon, a pair of fixed speed rotation transmitting gears and a pair of high speed rotation transmitting gears for individually transmitting rotation of the capstans to the respective reel gears, a plate-formed operating lever for operation of the tape recorder at a fixed speed, a pair of plate-formed operating levers for operation of the tape recorder at a high speed, a plate-formed stopping operating lever and a tape feeding direction reversing plate are mounted for individual movement, characterized in that a main base plate made of a synthetic resin material is held between and integrated with first and second auxiliary base plates made of a metal material or materials, and pairs of spacings for individually accommodating the reel gears, fixed speed rotation transmitting gears and high speed rotation transmitting gears therein are formed in the main base plate while support shafts for individually supporting the pinch roller supporting members for pivotal motion thereon are provided uprightly on the first auxiliary base plate and the plate-formed operating levers are disposed between the main base plate and the second auxiliary base plate.

With the base plate for an automatic tape recorder, since the pairs of spacings for individually accommodating the reel gears, fixed speed rotation transmitting gears and high speed rotation transmitting gears therein are formed in the main base plate while the plate-formed operating levers are disposed between the main base plate and the second auxiliary base plate, a large number of movable parts can be disposed densely in an overlapping relationship, and accordingly, a sufficiently great part mounting area can be assured without disposing a plurality of base plates in a parallel, spaced relationship. Besides, since the main base plate made of a synthetic resin material is reinforced as it is held between the first and second auxiliary base plates made of a metal material or materials, the tape recorder can be reduced in thickness while maintaining a predetermined strength. Further, shafts for the pinch roller supporting members can be mounted firmly to the first auxiliary base plate made of a metal material.

The spacings for accommodating the fixed rotation transmitting gears and the high speed rotation transmitting gears therein may be openings formed in and extending through the main base plate.

A specific embodiment of the present invention will now be described in detail by way of example with reference to the accompanying drawings.

DETAILED DESCRIPTION OF THE ILLUSTRATED EMBODIMENT

Figure 1:
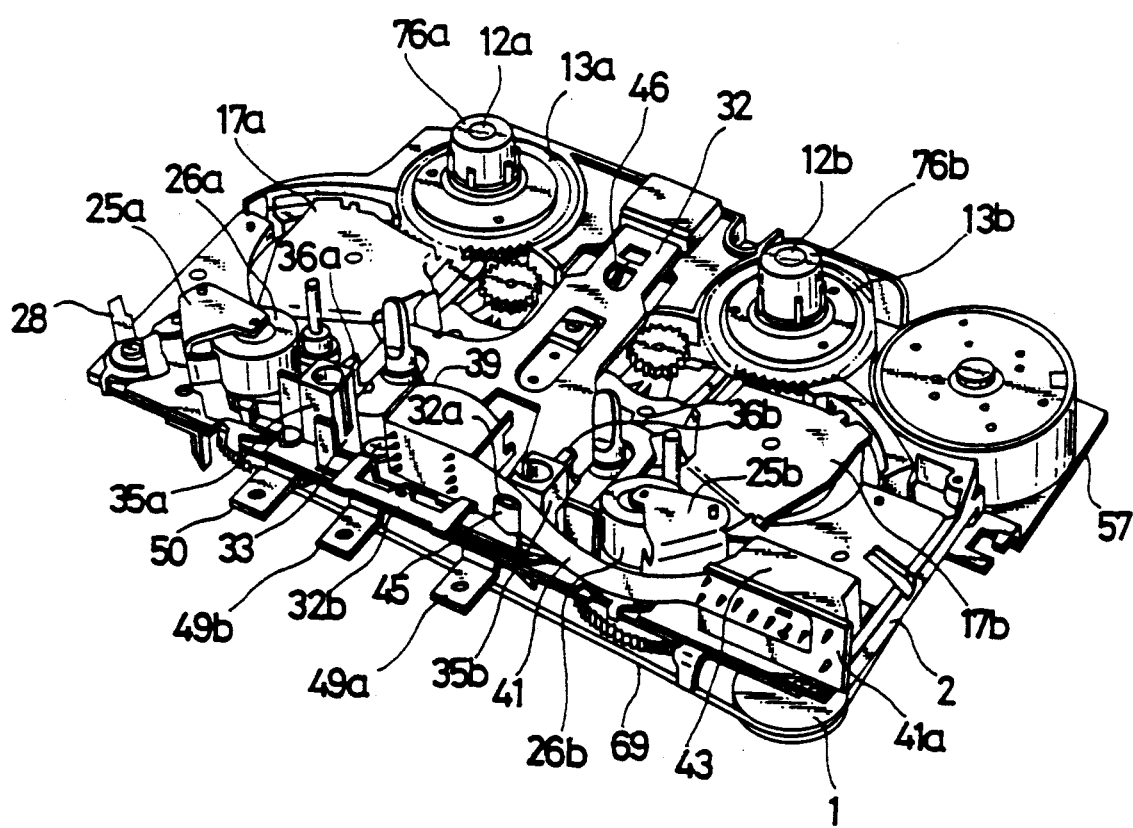
FIG. 1 is a perspective view of a tape recorder to which the present invention is applied.

Referring first to FIGS. 1 to 4, there is shown a tape recorder to which the present invention is applied. The tape recorder shown includes an idler pulley or rotary member 1 made of a synthetic resin material and supported for rotation at a corner portion of an upper face of a main base plate 2 also made of a synthetic resin material. Referring particularly to FIG. 5, a center bore 4 is bored in a hub 3 provided projectingly at the center of a lower face of the idler pulley 1, and a support shaft 6 is fitted in the center bore 4 of the idler pulley 1 to support the idler pulley 1 for rotation thereon. An end of the support shaft 6 is press fitted in and secured to a shaft fitting hole 5 formed in the main base plate 2. The support shaft 6 has an annular engaging groove 7 formed at the other end portion thereof, and a coming off preventing member 8 is fitted in the annular engaging groove 7 to prevent coming off of the idler pulley 1 from the support shaft 6. A tubular body 9 is formed in an integral relationship on the upper face of the main base plate 2 such that it surrounds the hub 3 of the idler pulley 1. The tubular body 9 has an inverted conical recess 10 formed at the center of the bottom of an inner bore thereof in a concentrical relationship with the shaft fitting hole 5 in the main base plate 2. Meanwhile, an enlarged bore portion 11 of a greater diameter is formed at the central portion of a lower end of the hub 3 in a contiguous relationship to the center bore 4. A lubricant retaining portion 9a of a greater diameter is formed at an upper end portion of an inner bore of the tubular body 9.

If lubricant such as grease is applied to a surface of the support shaft 6 and the idler pulley 1 is manually operated to fit the support shaft 6 into the center bore 4 of the hub 3 thereof, then the hub 3 is accommodated into the tubular body 9 of the base plate 2. Then, if the coming off preventing member 8 is fitted into the engaging groove 7 at the upper end of the support shaft 6, then assembly of the idler pulley 1 to the support shaft 6 is completed thereby as shown in FIG. 5. Upon such assembly of the idler pulley 1, the lubricant on the surface of the support shaft 6 is first received in a spacing formed by the enlarged bore portion 11 of the idler pulley 1 and the conical recess 10 of the base plate 2, and as the idler pulley 10 is rotated after then, the lubricant gradually penetrates between the support shaft 6 and the center bore 4 of the hub 3 of the idler pulley 1. Accordingly, there is no necessity of supplementing lubricant for a long period of time. Further, while the lubricant received in the spacing tends to leak to the outside by way of a gap between the outer periphery of the hub 3 and the tubular body 9, provision of the lubricant retaining portion 9a at the upper end portion of the inner bore of the tubular body 9 will prevent the lubricant from leaking to the outside of the tubular body 9 unless the lubricant is applied by an excessively large amount. Accordingly, lubricant can be supplied sufficiently between the support shaft 6 and the center bore 4 of the idler pulley 1, and possible occurence of a seizure can be prevented. Besides, even if tensible force of a transmission belt is applied as a lateral pressure to the idler pulley 1 or an unexpectedly high load is applied to the ilder pulley 1 during transportation or the like of the tape recorder, deformation of the support shaft 6 is prevented by the tubular body 9 of the base member 2. Accordingly, the support shaft 9 can be designed with a reduced diametrical dimension and an increased axial length.

Figure 2:
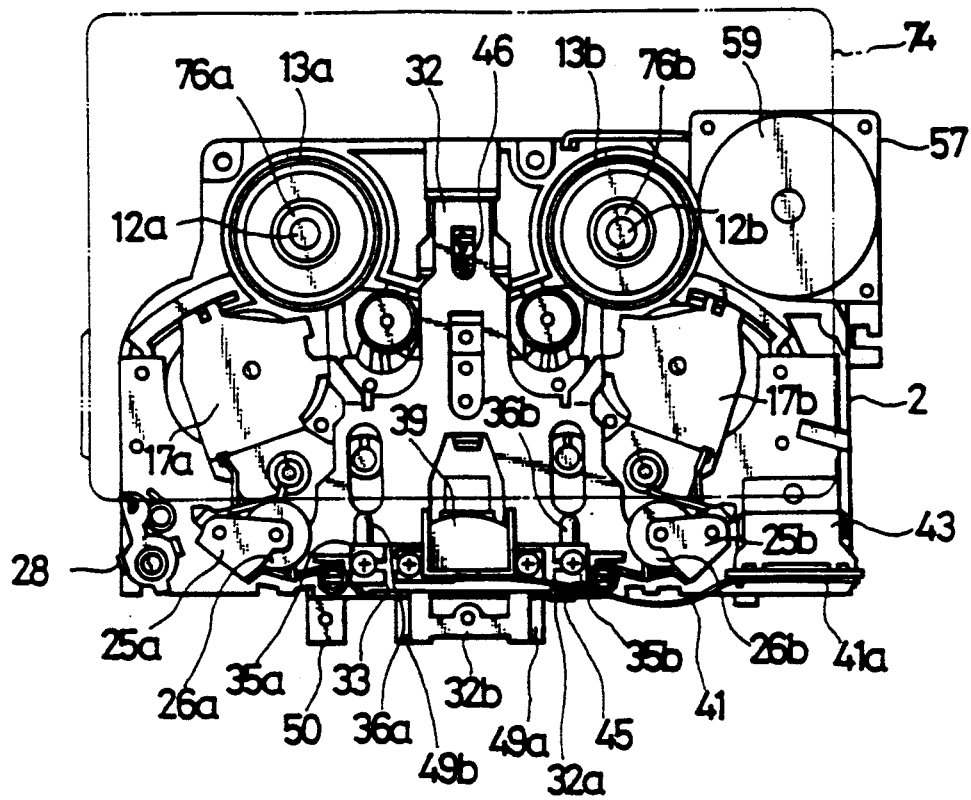
FIG. 2 is a top plan view of the tape recorder shown in FIG. 1.
Figure 4:
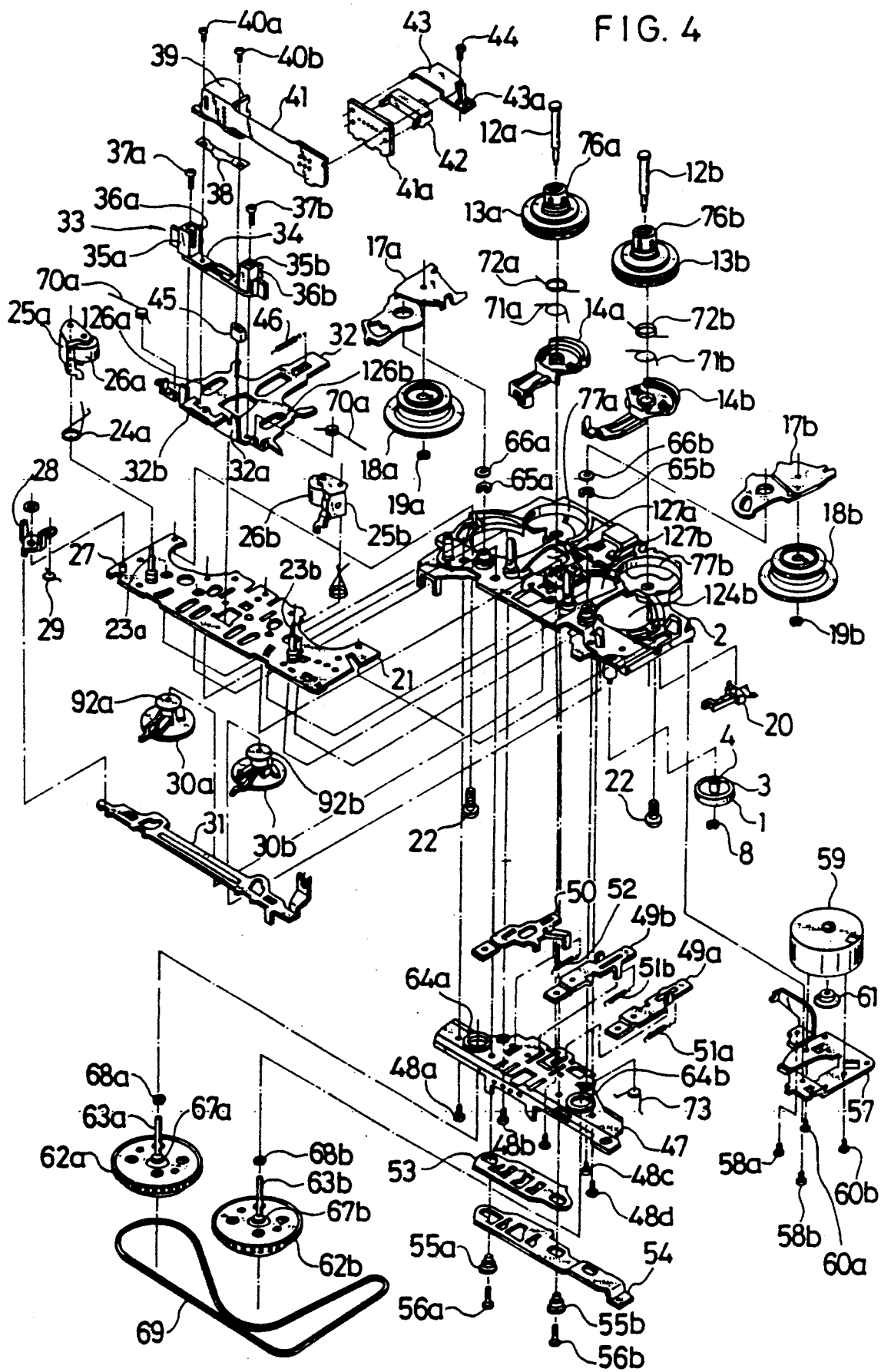
FIG. 4 is a fragmentary perspective view of the tape recorder shown in FIG. 1.
Figure 5:
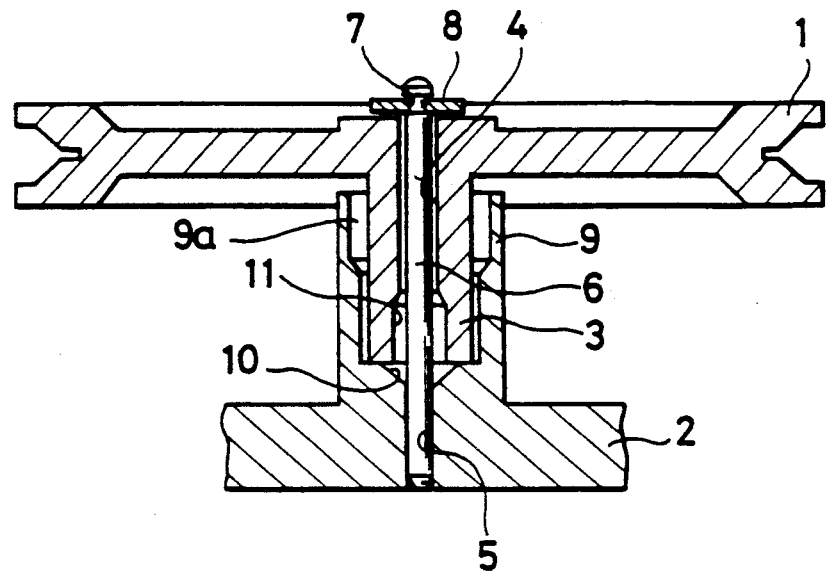
FIG. 5 is an axial sectional view showing, in an enlarged scale, a rotaty member supporting device of the tape recorder shown in FIG. 1.

Referring to FIGS. 1, 2 and 4, a pair of reel gears 13a and 13b and a pair of rotation detecting members 14a and 14b are supported for rotation on a pair of reel shafts 12a and 12b, respectively, and disposed in a symmetrical relationship at left and right locations of the main base plate 2. Two pairs of torsion coils springs 71a, 71b and 72a, 72b are located at central portions of the rotation detecting members 14a and 14b, respectively. The reel shafts 12a and 12b extend downwardly through and from a lower face of the main base plate 2, and a pair of coming off preventing members 15a and 15b are fitted around the downward extensions of the reel shafts 12a and 12b, respectively. A pair of mounting shafts 16a and 16b are mounted at left and right locations of a rear portion of the upper face of the main base plate 2, and a pair of idler gear supporting levers 17a and 17b are mounted for pivotal motion on the mounting shafts 16a and 16b, respectively. A pair of idler gears 18a and 18b are supported for rotation of shafts (not shown) formed on lower faces of free end portions of the idler gear supporting levers 17a and 17b, respectively, and a pair of coming off preventing members 19a and 19b are fitted on the shafts to prevent coming off of the idler gears 18a and 18b from the shafts. Meanwhile, coming off of the idler gear supporting levers 17a and 17b from the mounting shafts 16a and 16b is prevented by a head mounting base plate 32. As hereinafter described, the idler gears 18a and 18b have integral small diameter gears 90 on the upper side thereof, and the small diameter gears 90 are accommodated in a pair of spacings or openings 124a and 124b, respectively, formed in and extending through the main base plate 2.

A motor switch 20 is mounted on the lower face of a side portion of the main base plate 2. The motor switch 20 is turned on when the tape recorder is put into a mode in which a tape is fed, that is, when a tape is reproduced, fed fast or rewound. The switch 20 is operatively associated with a switch operating member 54 which will be hereinafter described.

A first auxiliary base plate 21 is securely mounted on the upper face of the main base plate 2 by means of a pair of fastening screws 22. A pair of pinch roller mounting levers 25a and 25b are mounted for pivotal motion on mounting shafts 23a and 23b provided at left and right locations of an upper face of the first auxiliary base plate 21, and a pair of torsion coil springs 24a and 24b are interposed between the pinch roller mounting levers 25a and 25b and the upper face of the first auxiliary base plate 21. A pair of pinch rollers 26a and 26b are supported for rotation on the pinch roller mounting levers 25a and 25b, respectively. The pinch rollers 26a and 26b are normally biased by biasing springs 70a and 70b in predetermined directions to move the pinch rollers 26a and 26b thereon away from a pair of capstan shafts 63a and 63b, respectively. The biasing springs 70a and 70b are retained at the opposite ends of the head mounting base plate 32 by their own elastic forces. A head pressing button (not shown) is mounted on a pressing button mounting portion 32b at a rear end of the head mounting base plate 32 such that a magnetic head 39 may be moved to its type reproducing positions by pushing at the head pressing button of the head mounting base plate 32. Meanwhile, the torsion coil springs 24a and 24b normally bias, at one ends thereof, the idler gear supporting levers 17a and 17b in predetermined directions, respectively. The other ends of the torsion coil springs 24a and 24b are held in contact with a pair of oilless metal members (not shown) which are provided on the mounting shafts 16a and 16b of the main base plate 2 for supporting thereon the capstan shafts 63a and 63b which are securely mounted on fly wheels 62a and 62b, respectively. Consequently, static electricity induced in the fly-wheels 62a and 62b is introduced to the first auxiliary base plate 21 by way of the torsion coil springs 24a and 24b. Static electricity thus introduced to the first auxiliary base plate 21 then flows to the ground side of an electric circuit (not shown) by way of mounting foot portion 43a of a switch mounting bracket 43 which will be hereinafter described. It is to be noted that a ground terminal (not shown) of the magnetic head 39 may otherwise be connected to the mounting foot portion 43a of the switch mounting bracket 43.

A change-over operating member 28 for manually reversing the tape feeding direction is supported for pivotal motion on a support shaft 27 at a rear corner portion of the upper face of the first auxiliary base plate 21. The change-over operating member 28 is normally biased in one direction by a torsion toggle spring 29. A pair of left and right fast feed gears 30a and 30b are disposed for rotation between the first auxiliary base plate 21 and the main base plate 2. A tape feeding direction reversing member 31 is also disposed between the first auxiliary base plate 21 and the main base plate 2. The tape feeding direction reversing member 31 engages at an end thereof with the change-over operating member 28 and at the other end thereof with a head signal change-over switch 42.

The head mounting plate 32 is mounted for limited sliding movement in forward and backward directions on the upper face of the first auxiliary base plate 21 under the guidance of a pair pf cassette guide pins 125a and 125b which are formed in an integral relationship on the upper face of the main base plate 2 and extend through a pair of elongated holes 126a and 126b formed in the head mounting plate 21. A tape guide member 33 is mounted on an upper face of the head mounting base plate 32. The tape guide meber 33 has a horizontal wall 34 and a pair of post-like portions 35a and 35b formed integrally upwardly at the opposite left and right ends of an upper face of the horizontal wall 34, and a pair of tape guides 36a and 36b are formed in an integral relationship on front faces of the post-like portions 35a and 35b, respectively. The tape guide member 33 is secured to the head mounting base plate 32 by means of a pair of fastening screws 37a and 37b, screwed into the post-like portions 35a and 35b respectively. The magnetic head 39 is securely mounted on the horizontal wall 34 of the tape guide member 33 via a spring plate 38 by a pair of fastening screws 40a and 40b. As the fastening screws 40a and 40b are tightened, the spring plate 38 is resiliently deformed, and the resilient force of the spring plate 38 prevents the fastening screws 40a and 40b from being loosened. Suitable adjustment of the tightening degree of the fastening screws 40a and 40b will attain adjustment of the magnetic head 39 to a desired vertical position with respect to the head mounting base plate 32 and also attain azimuth adjustment of the magnetic head 39. Although it may seem apparently difficult to make adjustment of the vertical position of the magnetic head 39 with respect to the head mounting base plate 32, the vertical position of the magnetic head 39 can actually be adjusted readily to the vertical position of a tape while the tape is being fed on the tape recorder. This eliminates a spacer which is conventionally interposed, when a magnetic head is assembled to a head mounting base plate in a conventional tape recorder, between the magnetic head and the head mounting base plate in order to adjust the magnetic head to a predetermined position.

A flexible printed circuit board 41 in the form of a tape is connected at an end thereof to the magnetic head 39. The head signal change-over switch 42 and the switch mounting bracket 43 are mounted at the other end of the flexible printed circuit board 41 with a plate 41a interposed therebetween in such a manner that the mounting bracket 43 covers the switch 42. The mounting bracket 43 is securely mounted at the mounting foot portion 43a thereof on the upper face of the first auxiliary base late 21 by means of a fastening screw 44. A rubber pipe 45 having a small axial length is fitted on a projection 32a formed uprightly on the head mounting base plate 32, and part of the flexible printed circuit board 41 is securely held between the rubber pipe 45 and the other side face of the post-like portion 35b of the tape guide member 33 (a face of the post-like portion 35b remote from the tape guide 36b). Consequently, part of the printed circuit board 41 is normally pressed against the post-like portion 35b of the tape guide member 33 by the resilient force of the rubber pipe 45, and accordingly, the printed circuit board 41 is held in position with certainty and the thus held portion of the printed circuit board 41 does not suffer from damaging. The head mounting base plate 32 is normally biased in the forward direction by a spring 46 which is connected at one end thereof to the head mounting base plate 32 and at the other end thereof to a second auxiliary base plate 47 disposed below the main base plate 2. The spring 46 also urges to closely contact the head mounting base plate 32 with the main base plate 2 below.

When the head mounting base plate 32 is moved backwardly to its tape reproducing or recording position against the spring 46, the magnetic head 39 is contacted with a magnetic tape (not shown) is a tape cassette 74 (see FIGS. 2 and 3) loaded in position on the tape recorder. Simultaneously, one of the pinch roller moving levers 25a and 25b is pivoted in one direction to move the pinch roller 26a or 26b thereon into contact with the corresponding capstand shaft 63a or 63b with the tape interposed therebetween. Consequently, the tape is fed in one direction by the capstan shaft 63a or 63b. Then, when the head mounting base plate 32 is moved forwardly by the spring 46, the magnetic head 39 is spaced away from the tape, and simultaneously the one pinch roller moving lever 25a or 25b is pivoted in the opposite direction to move the pinch roller 26a or 26b thereon away from the capstan shaft 63a or 63b.

Figure 3:
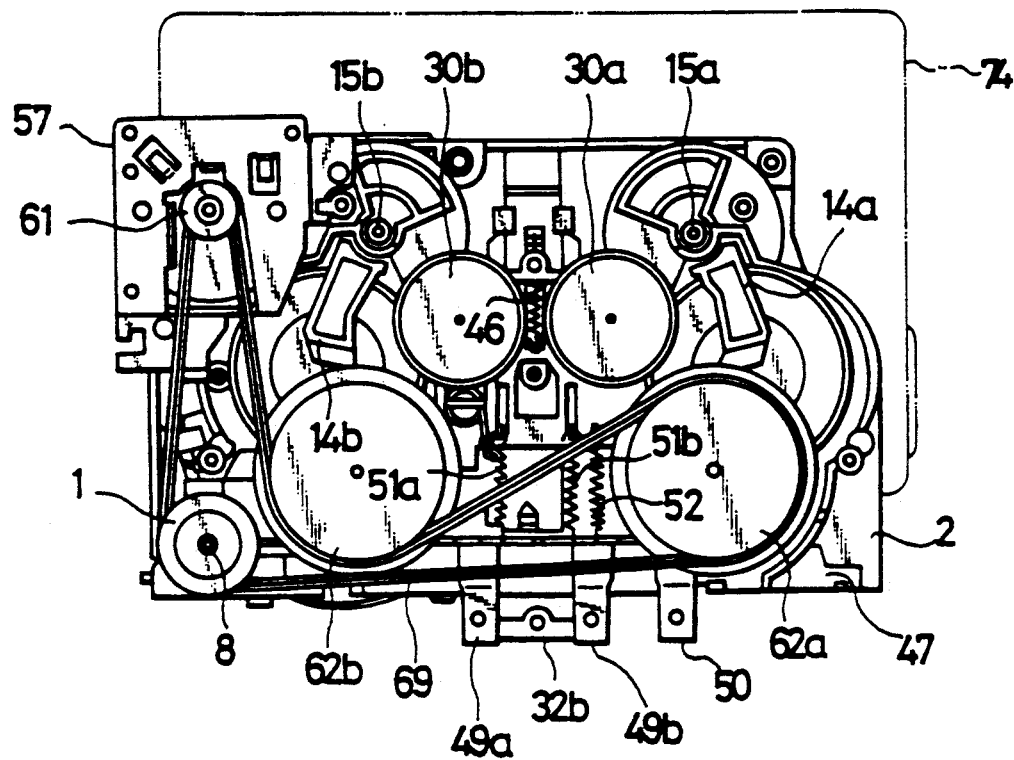
FIG. 3 is a bottom plan view of the tape recorder shown in FIG. 1.

Referring now to FIGS. 3 and 4, the second auxiliary base plate 47 made of a metal is securely mounted on the first auxiliary base plate 21 by means of fastening screws 48a, 48b, 48c and 48d and located below the main base plate 2. A pair of left and right fast reel feeding operating members 49a and 49b and a stopping operating member 50 are disposed for sliding movement between the second auxiliary base plate 47 and the main base plate 2 and normally biased in forward directions by springs 51a, 51b and 52, respectively. The operating members 49a, 49b and 50 are supported for back and forth movement with respect to the main base plate 2 as the second auxiliary base plate 47 is mounted on the first auxiliary base plate 21 with the main base plate 2 interposed therebetween.

The second auxiliary base plate 48 is bent laterally downwardly at a longitudinal edge portion thereof in order to reinforce the second auxiliary base plate 47 itself. Meanwhile, since the main base plate 2 is held between the first and second auxiliary base plates 21 and 47, the main base plate 2 is reinforced and possible distortion of the main base plate 2 itself originating in casting is corrected by the first and second auxiliary base plates 21 and 47.

An arresting member 53 and the switch operating member 54 are mounted for sliding movement in an overlapping relationship on a lower face of the second auxiliary base plate 47 by means of a pair of sleeves 55a and 55b and a pair of fastening screws 56a and 56b. The fastening screws 56a and 56b are fitted in the sleeves 55a and 55b, respectively, and extend through fitting holes formed in the second auxiliary base plate 47 and the main base plate 2 as far as they are screwed into threaded holes formed in the first auxiliary base plate 21. A torsion coil spring 73 is mounted on the lower face of the second auxiliary base plate 47. The arresting member 53 is designed to arrest the operating members 49a and 49b individually at a position for a predetermined operation mode of the tape recorder. To the contrary, the switch operating member 54 is designed to turn and keep the motor switch 20 on when the tape recorder enters and remains in a mode in which a tape is fed such as a reproducing mode, a fast feeding mode or a rewinding mode.

A motor mounting bracket 57 made of a metal is securely mounted at a side portion of the lower face of the main base plate 2 by means of a pair of fastening screws 58a and 58b, and a tape feeding motor 59 is securely mounted on an upper face of the bracket 57 by means of a pair of fastening screws 60a and 60b. A motor pulley 61 is mounted on an output power shaft (not shown) of the tape feeding motor 59. A pair of fly-wheels 62a and 62b are mounted for rotation on a lower face of the second auxiliary base plate 47. Each of the fly-wheels 62a and 62b has the capstan shaft 63a or 63b securely mounted thereon. The capstan shaft 63a or 63b extends through a fitting hole 64a or 64b formed in the second auxiliary base plate 47 and further into and upwardly from a center bore formed in the mounting shaft 16a or 16b of the main plate 2, and two pairs of coming off preventing members 65a, 65b and 66a, 66b are fitted on the upper extensions of the capstan shafts 63a and 63b of the fly-wheels 62a and 62b, respectively.

A pair of small diameter gears 67a and 67b are formed at base end portions of the capstan shafts 63a and 63b of the fly-wheels 62a and 62b as seen in FIG. 4 and held in normal meshing engagement with the idler gears 18a and 18b, respectively. When the idler gear supporting levers 17a and 17b are pivoted toward the center of the main base plate 2, the idler gears 18a and 18b are brought into meshing engagement with the reel gears 13a and 13b, respectively, so that rotation of the fly-wheels 62a and 62b is transmitted to the reel shafts 12a and 12b via the idler gears 18a and 18b, respectively. The idler gear supporting levers 17a and 17b are held in engagement at one ends thereof with the tape feeding direction reversing member 31 such that, when the tape feeding direction reversing member 31 is moved leftwardly or rightwardly, the idler gear supporting levers 17a and 17b are pivoted leftwardly or rightwardly by the tape feeding direction reversing member 31. Accordingly, when one of the idler gears 18a and 18b is transmitting rotation to the corresponding reel shaft 12a or 12b, the other idler gear 18b or 18a is spaced from the corresponding reel gear 13b or 13a and does not transmit rotation to the reel gear 13b or 13a.

A pair of coming off preventing members 68a and 68b are fitted on the capstan shafts 63a and 63b and located on upper faces of the small diameter gears 67a and 67b. An endless belt 69 extends along the fly-wheels 62a and 62b, motor pulley 61 and idler pulley 1 so that the capstan shafts 63a and 63b may be rotated by the tape feeding motor 59 by way of the endless belt 69.

Figure 6:
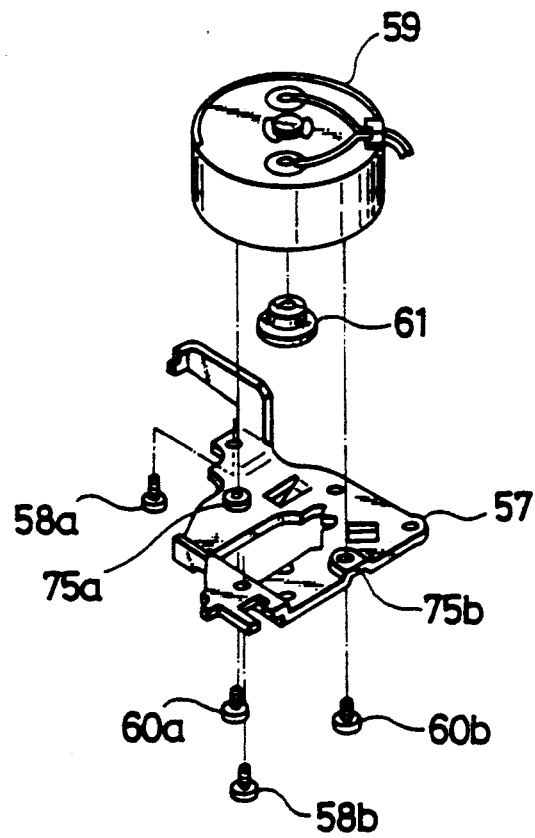
FIG. 6 is a perspective view showing a modified motor mounting bracket.

The motor 59 can be mounted at a different vertical position where portions 75a and 75b of the motor mounting bracket 57 which surround the threaded holes for the fastening screws 60a and 60b, respectively, are protruded upwardly as shown in FIG. 6 by drawing or some other means. Thus, even if the motor 59 is different in configuration (particularly in height), a suitable motor mounting bracket can be produced only by drawing such threaded hole surrounding portions 75a and 75b to a dimension or dimensions conforming to the motor.

Figure 7:
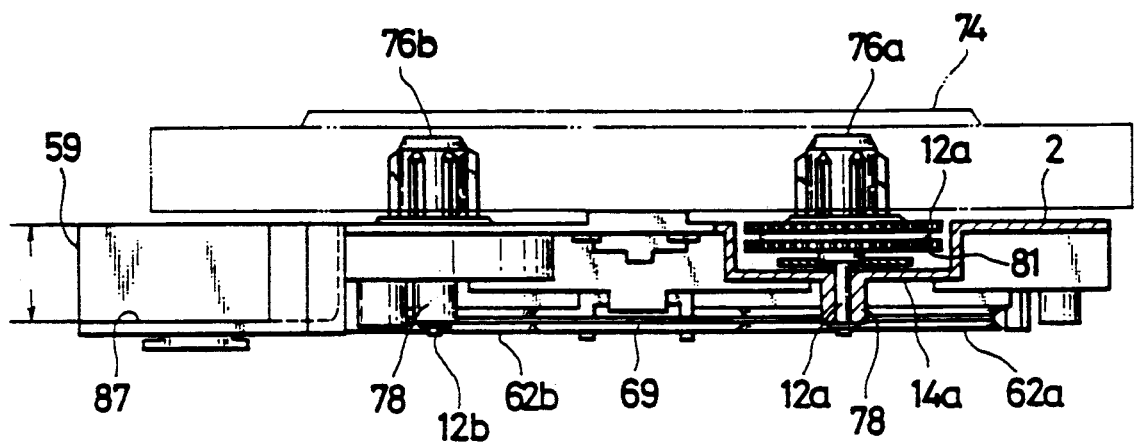
FIG. 7 is a rear elevational view, partly in section, of the tape recorder shown in FIG. 1.
Figure 8:
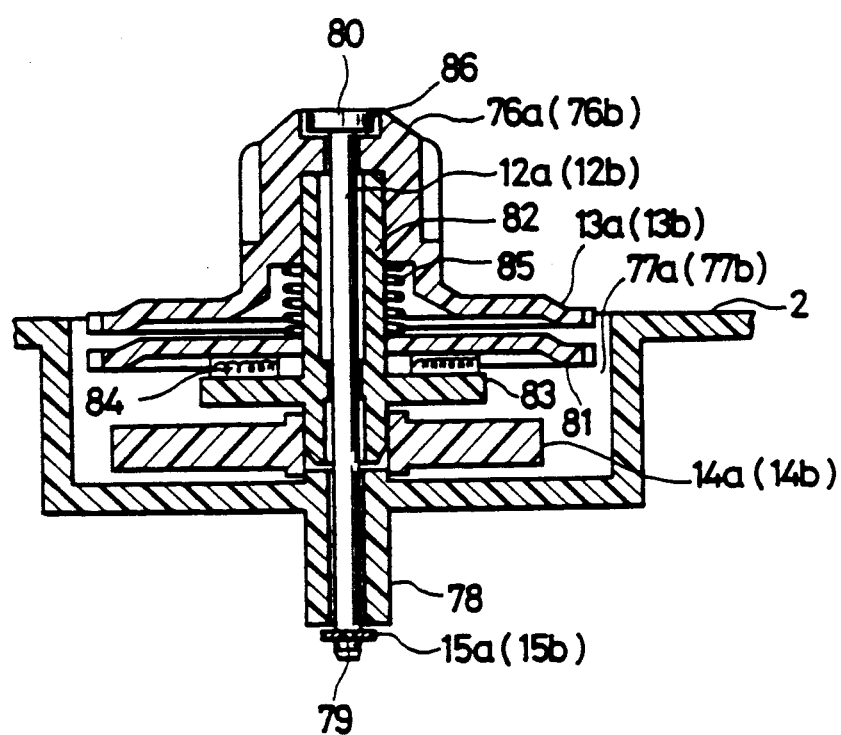
FIG. 8 is an axial sectional view showing, in an enlarged scale, a reel receiver mounting mechanism of the tape recorder shown in FIG. 1.

Referring now to FIGS. 7 and 8, each of the reel gears 13a and 13b has an integral reel receiver 76a or 76b for engaging with a reel hub (not shown) of a tape cassette 74. The reel receivers 76a and 76b are mounted on the main base plate 2 individually by means of a pair of reel receiver mounting mechanisms described below. It is to be noted that since the reel receiver mounting mechanisms for both of the reel receivers 76a and 76 are similar in construction to each other, description will be given only of the reel receiver mounting mechanism for the reel receiver 76a to avoid redundancy.

Referring particularly to FIG. 8, the main base plate 2 has a pair of downwardly projected cylindrical portions 77a and 77b like bottomed vessels formed thereon. A cylindrical shaft supporting portion 78 is formed in an integral relationship at and extends downwardly from the center of the bottom wall of each of the cylindrical portions 77. The shaft receiving portion 78 is disposed within the range L of the axial dimension of the motor 59 as seen in FIG. 7. The reel shaft 12a is supported at a lower end portion thereof in the shaft supporting portion 78, and the reel receiver 76a is supported for rotation on the reel shaft 12a. The reel shaft 12a has an annular coming off preventing member receiving groove 79 formed in an outer periphery of a lower end portion thereof and has a coming off preventing head 80 formed at the top end thereof. The coming off preventing member 15a which may be a washer is fitted in the coming off preventing member receiving groove 79 of the reel shaft 12a to prevent the reel shaft 12a from coming off in an axially upward direction from the shaft supporting portion 78 of the main base member 2.

The rotation detecting member 14a, a rotation transmitting gear 81, the reel gear or reel base 13a and the reel receiver 76a are fitted in a layered condition in this order from below on a sleeve 82 which is fitted for rotation around the reel shaft 12a. The reel gear 13a is formed in an integral relationship on an outer periphery of a lower end or base portion of the reel receiver 76a. A flange 83 is formed in an integral relationship on an outer periphery of the sleeve 82 between the rotation transmitting gear 81 and the rotation detecting member 14a, and a friction plate 84 in the form of a felt plate is interposed between the flange 83 and the rotation transmitting gear 81. A compression coil spring 85 is interposed between the rotation transmitting gear 81 and the reel receiver 76a to bias the rotation transmitting gear 81 and the reel receiver 76a in the opposite directions to move away from each other. A stepped portion 86 at the center of the top end of the reel receiver 76a is engaged with and stepped by a lower end face of the coming off preventing head 80 of the reel shaft 12a thereby to prevent the reel receiver 76a from coming off from the top end of the reel shaft 12a. Meanwhile, the rotation transmitting gear 81 is biased to engage with the flange 83 of the reel shaft 12a via the friction plate 84.

In assembling the reel receiver mounting mechanism, at first the rotation detecting member 14a, friction plate 84, rotation transmitting gear 81, compression coil spring 85, reel gear 13a and reel receiver 76a are fitted successively onto the sleeve 82, and then the reel shaft 12a is fitted into the sleeve 82 from the side of the top end of the reel receiver 76a. Then, one end portion of the reel shaft 12a is inserted into the shaft supporting portion 78 of the main base plate 2, and then the coming off preventing member 15a is fitted into the coming off preventing member receiving groove 79 of the reel shaft 12a, thereby completing the assembly. In the thus assembled condition, the rotation detecting member 14a, rotation transmitting gear 81 and reel gear 13a are all accommodated in the cylindrical vessel-like portion 77 of the main base plate 2 with an upper face of the reel gear 13a positioned substantially in flush with the upper face of the main base plate 2.

Referring to FIGS. 1 and 4, the tape feeding motor 59 is accommodated in a motor accommodating recess 87 formed at a right front corner of the main base plate 2. The motor 59 has a considerably small axial dimension and has an upper face positioned substantially in flush with the upper face of the main base plate 2. A lower axial end face of the motor 59 is held in closely contacting relationship on an upper face of a bottom wall of the motor accommodating recess 87 of the main base plate 2. Again, rotation of the output power shaft of the motor 59 is transmitted to the capstan shafts 63a and 63b by way of the motor pulley 61, endless belt 69 and fly-wheels 62a and 62b.

Figure 9:
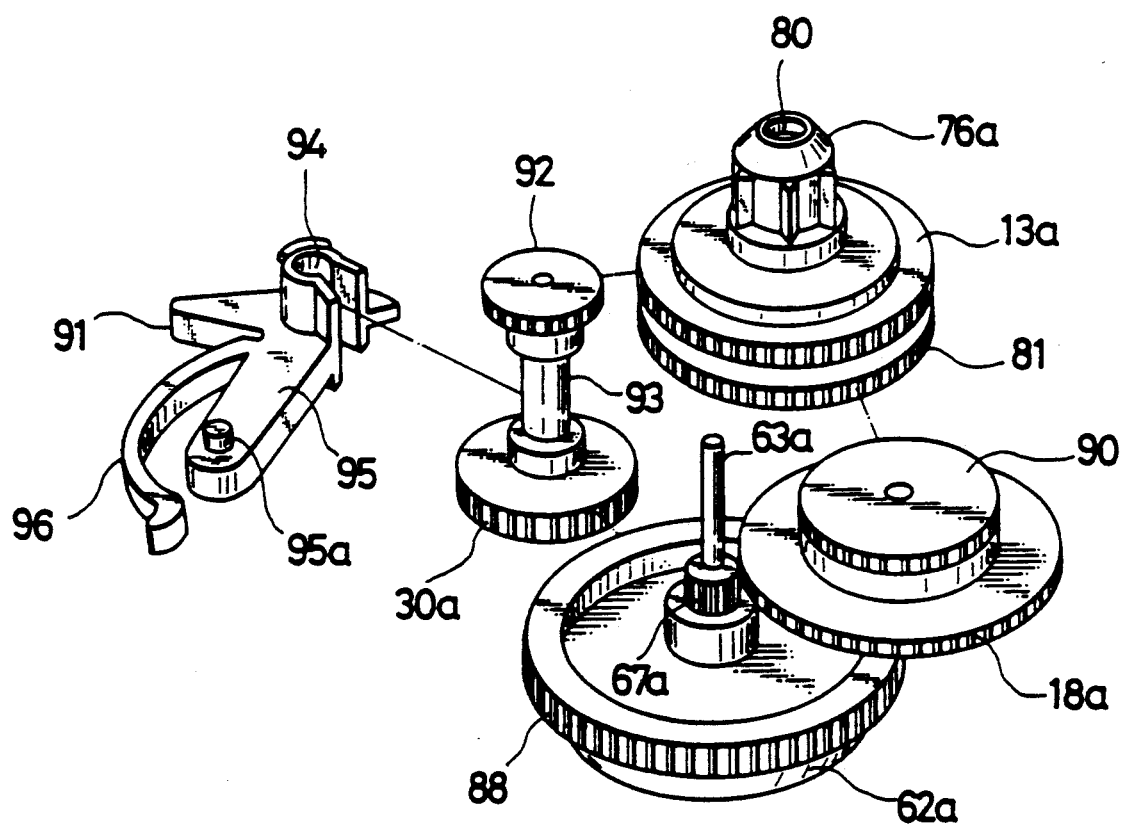
FIG. 9 is a fragmentary perspective view of a high speed feeding mechanism of the tape recorder shown in FIG. 1.

Rotation of the capstan shafts 63 and 63a are transmitted individually by fixed or low speed rotation transmitting mechanisms to rotate the reel receivers 76a and 76b, respectively. Referring now to FIG. 9, the fixed speed rotation transmitting mechanism to the reel receiver 76a is shown. Rotation of the capstan shaft 63a is transmitted to the rotation transmitting gear 81 via the small diameter gear 67a secured to the capstan shaft 63a, the fixed speed transmitting large diameter gear or cam gear 18a held in meshing engagement with the small diameter gear 67a, and a fixed speed transmitting small diameter gear 90 mounted for coaxial integral rotation on the fixed speed transmitting large diameter gear 18a and held in meshing engagement with the rotation transmitting gear 81. The reel receiver 76a is thus rotated at a fixed speed by way of the fixed speed rotation transmitting mechanism. Meanwhile, rotation of the capstan shaft 63a is transmitted to the reel gear 13a via a large diameter gear 88 secured to the capstan shaft 63a, the high speed transmitting large diameter gear 30a for meshing engagement with the large diameter gear 88, and a high speed transmitting small diameter gear 92 mounted for coaxial integral rotation with the high speed transmitting large diameter gear 30a and for movement into or output meshing engagement with the reel gear 13a. The reel receiver 76a is thus rotated at a high speed by the high speed rotation transmitting mechanism. It is to be noted that the high speed transmitting small diameter gears 92 are accommodated in a pair of spacings or openings 127a and 127b formed in and extending through the main base plate 2.

The high speed transmitting large and small diameter gears 30a and 92 are securely mounted on a shaft 93 which is supported for rotation in a bearing portion 94 at an end of a pivotal plate 95. The pivotal plate 95 is mounted at a pivot shaft 95a at the other end thereof for pivotal motion on the main base plate 2. When the pivotal plate 95 is pivoted in the clockwise direction in FIG. 9, the high speed transmitting large diameter gear 30a is brought into meshing engagement with the large diameter gear 88 of the capstan shaft 63a while the high speed transmitting small diameter gear 92 is brought into meshing engagement with the reel gear 13a. On the contrary, when the pivotal plate 95 is pivoted in the opposite or counterclockwise direction, the high speed transmitting large diameter gear 30a is brought out of meshing engagement with the large diameter gear 88 of the capstan shaft 63a while the high speed transmitting small diameter gear 92 is brought out of meshing engagement with the reel gear 13a. It is to be noted that the fixed speed transmitting large diameter gears 18a and 18b are individually held in normally meshed engagement with the small diameter gears 67a and 67b.

The pivotal plate 95 is normally biased in the opposite or counterclockwise direction in FIG. 9 to move the high speed transmitting small diameter gear 92 away from the reel gear 13a by a resilient finger 96 formed in an integral relationship on a side face of the pivotal plate 95. The pivotal plate 95 has a lateral pressure receiving tongue 91 formed in an integral relationship thereon. Referring also to FIGS. 3 and 4, the pivotal plate 96 is positioned such that, when the fast reel feeding operating member 49b is manually pushed to move backwardly against the return spring 51b, an end portion thereof is engaged with the pressure receiving tongue 91 of the pivotal plate 95 to pivot the pivotal plate 95 in the clockwise direction to render the high speed rotation transmitting mechanism to the reel receiver 13a effective.

It is to be noted that, though not specifically shown, the fixed speed rotation transmitting mechanism to the other reel receiver 76b has a similar construction to that described above but has a symmetrical configuration with respect to a center line of the head mounting base plate 32.

Figure 10:
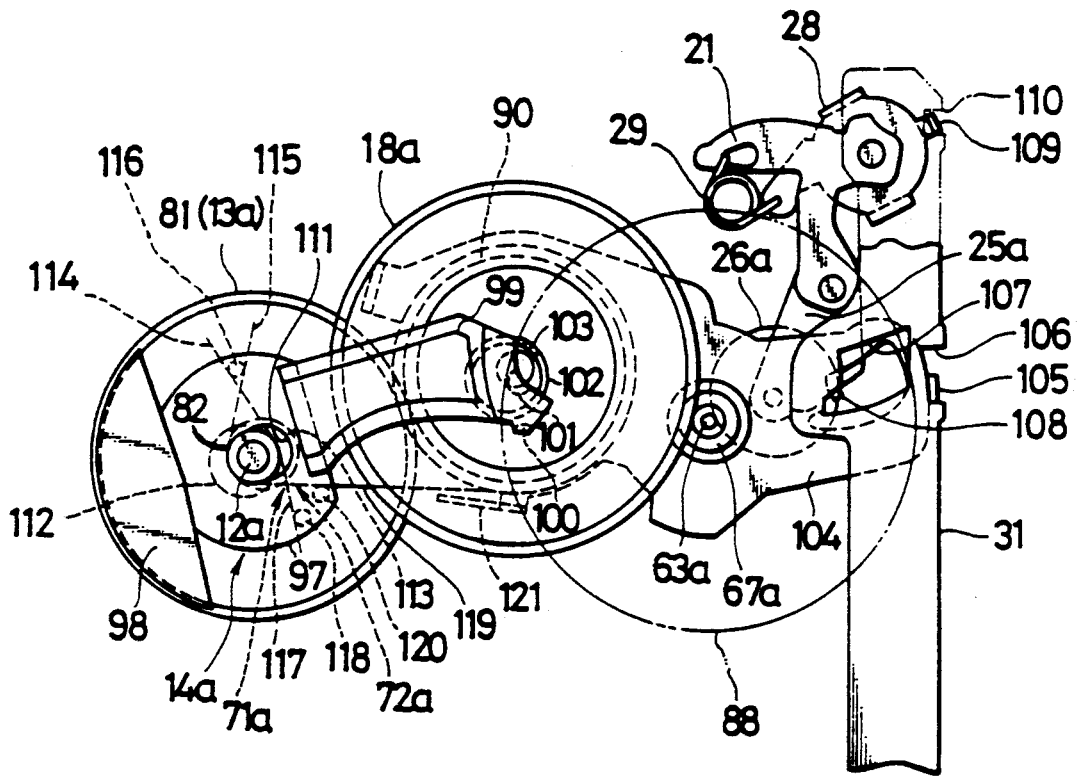
FIGS. 10 and 11 are schematic plan views showing different positions of an automatic reversing mechanism of the tape recorder shown in FIG. 1.

Referring now to FIG. 10, there is shown an automatic reversing mechanism of the tape recorder for automatically reversing the tape feeding direction when a tape is taken up to its last end. In particular, the automatic reversing mechanism includes the rotation detecting members 14a and 14b mentioned hereinabove, and only the rotation detecting member 14a is shown in FIG. 10. The rotation detecting member 14a shown is in the form of a plate member 97 having an elongated fitting hole 111 formed at a central portion thereof. The sleeve 82 is fitted in the elongated fitting hole 111 for supporting the plate member 97 for rotation thereon. The plate member 97 has a crescent-shaped weight balancer 98 formed in an integral relationship at an end thereof for maintaining the rotation detecting member 14a in a fixed orientation irrespective of an orientation of the tape recorder. A projection 99 is provided at the other end of the plate member 97, and a cam contacting piece 100 and an abutting piece 101 are formed in an integral relationship at an end portion of the projection 99. When the reel gear 13a is rotated in the counterclockwise direction in FIG. 10, the rotation detecting member 14a is frictionally urged in the same direction to slidably engage the cam contacting piece 100 thereof with a peripheral cam face of an annular eccentric cam 102 formed at the center of a lower face of each of the fixed speed transmitting large diameter gears 18a and 18b.

When a tape not shown is taken up to its last end so that the reel gear 13a is stopped to cause the urging force of the rotation detecting member 14a to disappear, the abutting piece 101 of the rotation detecting member 14a is moved to a position on a locus of rotation of a pressing piece 103 of the fixed speed transmitting large diameter gear 18a so that it is soon contacted by the pressing piece 103. The fixed speed transmitting large diameter gear 18a and the fixed speed transmitting small diameter gear 90 are supported for rotation on a pivotal plate 104. The pivotal plate 104 is mounted for back and forth pivotal motion within a predetermined range around the capstan shaft 63 on the main base plate 2.

After the abutting piece 101 of the rotation detecting member 14a is contacted by the pressing piece 103 of the fixed speed transmitting large diameter gear 18a as described above, the pivotal plate 104 is pivoted in the clockwise direction in FIG. 10 by the turning force of the fixed speed transmitting large diameter gear 18a to move the fixed speed transmitting small diameter gear 90 away from the rotation transmitting gear 81, thereby interrupting the rotation transmitting path to the reel receiver 76a.

The pivotal plate 104 has an engaging bent lug 105 formed at an end thereof, and the engaging bent lug 105 is engaged in an engaging recess 106 formed in the tape feeding direction reversing member 31. The tape feeding direction reversing member 31 is mounted for sliding movement within a predetermined range in the leftward and rightward directions of the tape recorder. The tape feeding direction reversing member 31 has a pair of left and right engaging holes 108 formed therein, and engaging bent lugs 107 formed on the pinch lever moving levers 25a and 25b are individually engaged in the engaging holes 108.

When the pivotal plate 104 is pivoted in the clockwise direction in FIG. 10 as described above, the tape feeding direction reversing member 31 is slidably moved in the downward direction in FIG. 10 by the pivotal plate 104 whereupon the other pivotal plate 104 not shown in FIG. 10 is pivoted in the same direction to bring the fixed speed transmitting small diameter gear 90 on the other side into meshing engagement with the corresponding rotation transmitting gear 81. Upon such sliding movement of the tape feeding direction reversing member 31, the pinch lever moving levers 25a and 25b are pivoted by the tape feeding direction reversing member 31. In this manner, one of the pinch rollers 26a and 26b is spaced away from the corresponding capstan shaft 63a or 63b while the other pinch roller 26b or 26a is contacted with the corresponding capstan shaft 63b or 63a.

It is to be noted that a similar mechanism is provided for the other rotation detecting member 14b but has a symmetrical configuration with respect to the center line of the head mounting base plate 32.

When the tape feeding direction reversing member 31 is slidably moved in the downward direction in FIG. 10 as described above, after it is slidably moved to an intermediate position by the urging force of the pivotal plate 104, it is slidably moved in the same direction by a biasing force of the torsion toggle spring 29. The torsion toggle spring 29 is connected at an end thereof to the first auxiliary base plate 21 and at the other end thereof to the change-over operating member 28. The change-over operating member 28 has an engaging bent lug 109 formed at an end thereof, and the engaging bent lug 109 is engaged in a second engaging groove 110 formed in the tape feeding direction reversing member 31. All of the components provided for transmission of rotation described above are disposed within the range L of the axial dimension of the tape feeding motor 59 similarly to the shaft supporting portion 78 of the main base plate 2 described hereinabove (refer to FIG. 9).

Referring to FIG. 4, if the head pressing button (not shown) of the head mounting base plate 32 is pushed, the head mounting base plate 32 is moved to its tape reproducing position in which a magnetic tape not shown is reproduced by the magnetic head 39. If, in this condition, the stopping operating member 50 is manually pushed in, the head mounting base plate 32 is moved back to its home position by the return spring 46. The stopping operating member 50 is then moved back to its home position by the return spring 52.

Referring back to FIGS. 4 and 10, the torsion coil springs 71a and 72a are located between the rotation detecting member 14a and the rotation transmitting gear 13a. Intermediate coiled portions 112 and 113 of the torsion coil springs 71a and 72a are fitted around the sleeve 82 for the reel receiver 76a while intermediate coiled portions 112 and 113 of the torsion coil springs 71b and 72b are fitted around the sleeve 82 for the reel receiver 76a. One end portions 114 and 115 of the torsion coil springs 71a and 72a are normally arrested by a first arresting projection 116 provided on a lower face of the rotation detecting member 14a. The other end portion 117 of the torsion coil spring 71a is normally arrested by a second arresting projection 118 provided on the lower face of the rotation detecting member 14a. The other end portion 119 of the other torsion coil spring 72a is located for arresting engagement either by a third arresting projection 120 provided on the lower face of the rotation detection member 14a or by an extension 121 of the pivotal plate 104. The torsion coil springs 71b and 72b are disposed in a similar manner to the torsion coil springs 71a and 72a but in a symmetrical relationship with respect to the center line of the head mounting base plate 32.

Operation of the cassette tape recorder having such construction as described above will be described below. It is to be noted that the tape recorder has a reproducing function, an automatic reversing function, and a high speed feeding function.

(1) Reproducing Operation

If a tape cassette 74 is loaded in position on the reel receivers 76a and 76b of the tape recorder as seen in FIG. 2 and then the pressing button mounting portion 32b of the head mounting base plate 32 is manually pushed in, then the head mounting base plate 32 is moved backwardly until the magnetic head 39 is contacted with a tape (not shown) within the tape cassette 74. Simultaneously, one of the pinch rollers 26a and 26b, for example, the pinch roller 26a, is contacted with the corresponding capstan shaft 63a and the tape feeding motor 59 is energized so that the corresponding reel receiver 76a and the capstan shafts 63a and 63b are rotated. Consequently, the tape is fed at a fixed speed from the right reel receiver 76a side to the left reel receiver side 76b in FIG. 2, and while the tape is thus fed, it is reproduced by the magnetic head 39.

(2) Automatic Reversing Operation

Figure 11:
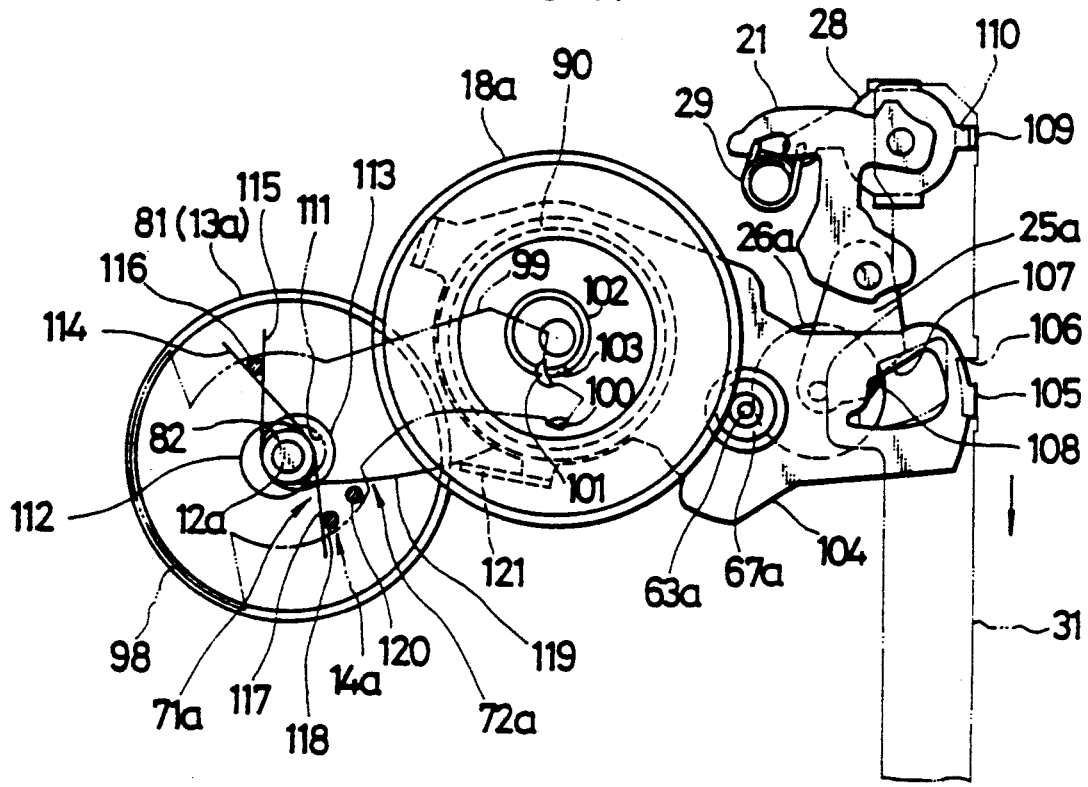

During such reproducing operation, the rotation detecting member 14a on the tape taking up side is urged in one direction, that is, in the clockwise direction in FIG. 10, by rotation of the corresponding reel gear 13a so that the cam contacting piece 100 thereon is slidably contacted with the cam face of the eccentric cam 102 of the corresponding fixed speed transmitting large diameter gear 18a. Accordingly, the abutting piece 101 on the rotation detecting member 14a is not engaged with the pressing piece 103 of the fixed speed transmitting large diameter gear 18a. Then, when the tape is taken up to its last end, the reel receiver 76a on the tape taking up side is stopped compulsorily so that the urging force upon the rotation detecting member 14a disappears, and consequently, the abutting piece 101 on the rotation detecting member 14a is soon moved to a position on the locus of rotation of the pressing piece 103 of the fixed speed transmitting large diameter gear 18a and then contacted by the pressing piece 103 as seen in FIG. 11. As a result, the corresponding pivotal plate 104 is subsequently pivoted in one direction, that is, in the clockwise direction in FIG. 11, by the turning force of the fixed speed transmitting large diameter gear 18a whereupon the fixed speed transmitting small diameter gear 90 is spaced away from the corresponding rotation transmitting gear 81, thereby interrupting the rotation transmitting route to the reel receiver 76a. Upon such pivotal motion of the pivotal plate 104, the tape feeding direction reversing member 31 is slidably moved in one direction, that is, in the downward direction in FIG. 11, so that the other pivotal plate 104 is pivoted in the same direction. Consequently, the other fixed speed transmitting small diameter gear 90 is now brought into meshing engagement with the corresponding rotation transmitting gear 81.

Also upon such sliding movement of the tape feeding direction reversing member 81, the pinch roller 26a is spaced away from the corresponding capstan shaft 63a while at the same time the pinch roller 26b on the other side is contacted with the corresponding capstan shaft 63b. Consequently, the tape feeding direction is reversed and the tape is now fed in the opposite direction.

(3) Fast Feeding Operation

Figure 12:
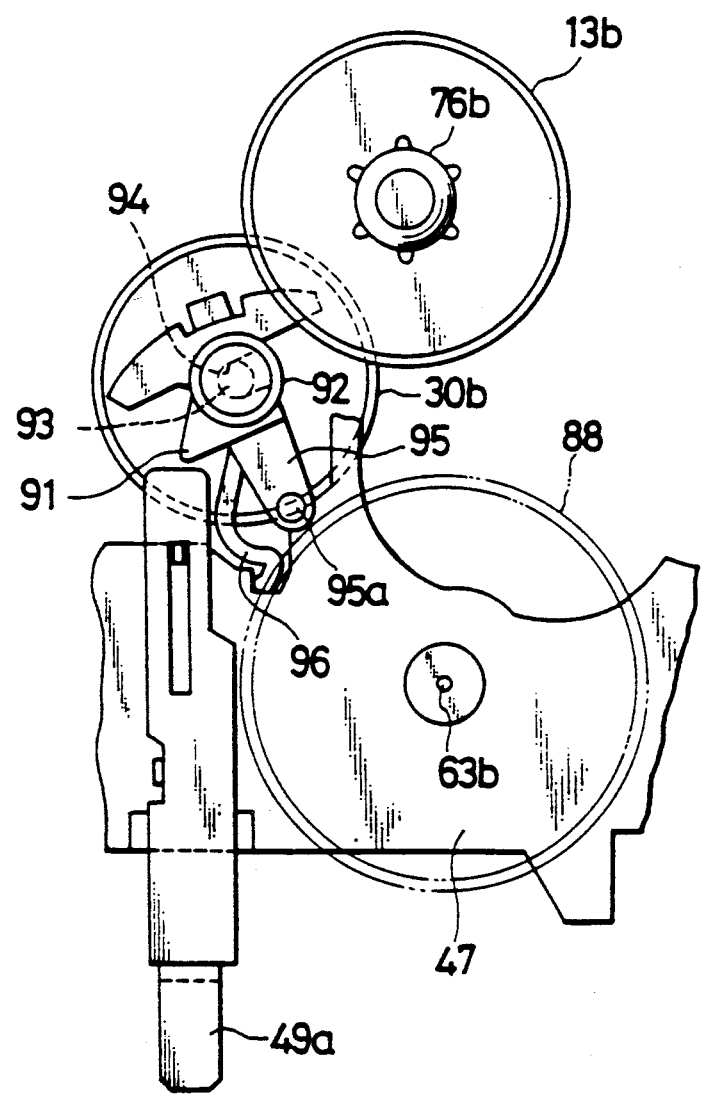
FIGS. 12 and 13 are schematic plan views showing different positions of the high speed feeding mechanism shown in FIG. 11.
Figure 13:
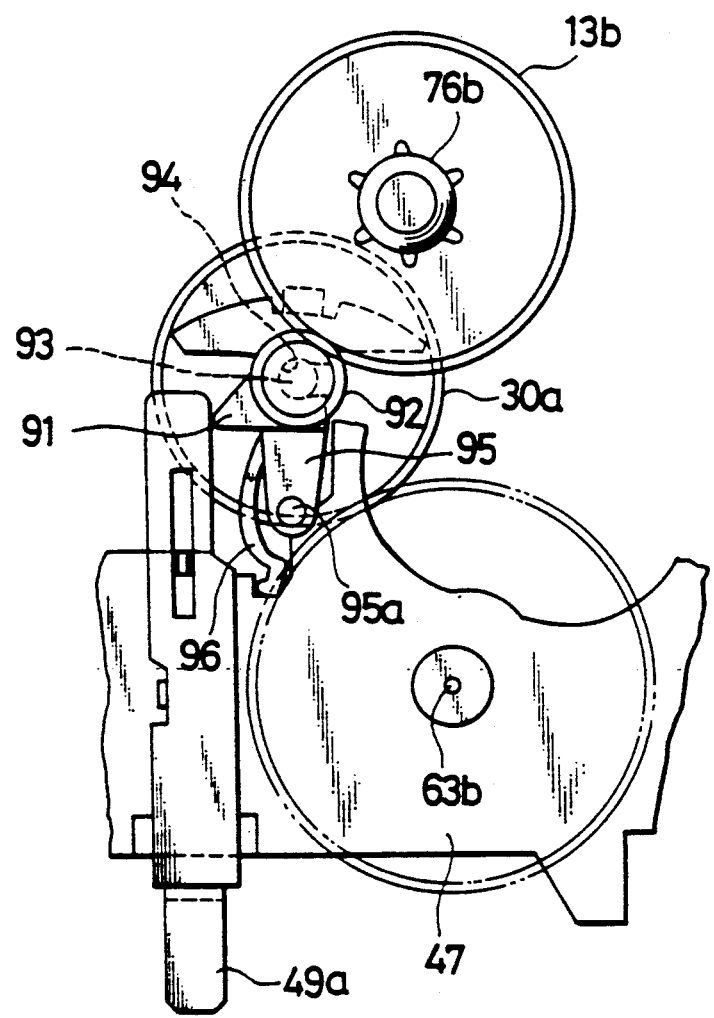
Figure 15:
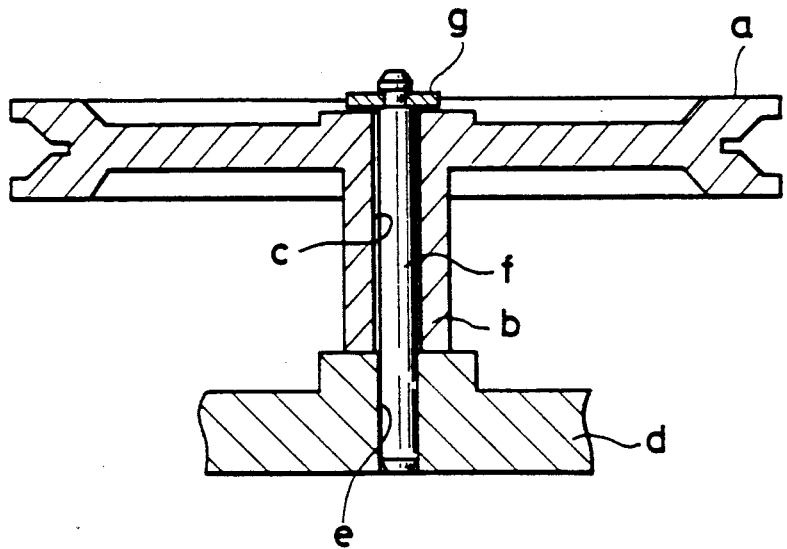
FIG. 15 is a view similar to FIG. 5 but showing a conventional rotary member supporting device.

When it is intended to feed a tape in the rightward direction in FIG. 2 while the tape is being fed in the rightward or leftward direction to make reproducing operation, the right fast reel feeding operating member 49a is manually pushed in. FIG. 12 shows a position of the right fast reel feeding operating member 49a before it is pushed in. In the position shown in FIG. 12, the high speed transmitting large diameter gear 30b and the high speed transmitting small diameter gear 92 are held out of meshing engagement with the large diameter gear 88 on the capstan shaft 63b and the reel gear 13b of the reel receiver 76b. In this condition, if the right fast reel feeding operating member 49a is manually pushed in, then the corresponding pivotal plate 95 is pivoted in one direction, that is, in the clockwise direction in FIG. 12, around the pivot shaft 95a thereof to bring the high speed transmitting large diameter gear 30b and the high speed transmitting small diameter gear 92 into engagement with the large diameter gear 88 of the reel capstan shaft 63b and the reel gear 13b of the reel receiver 76b, respectively, thereby reaching such a condition as shown in FIG. 13. In the condition shown in FIG. 13, the right reel receiver 76b is rotated at a high speed, and consequently, the tape is fed at a high speed in the rightward direction in FIG. 13.

To the contrary, when it is intended to feed a tape in the leftward direction in FIG. 2 during reproducing operation, the left fast reel feeding operating member 49b is manually pushed in. Consequently, the tape is fed in the leftward direction at a high speed in a similar manner as described above.

(4) Stopping Operation

If the stopping operating member 50 is manually pushed in, the head mounting base plate 32 is moved back to its home position by the biasing force of the spring 46 whereupon the magnetic head 39 is spaced away from the tape. At the same time, the pinch rollers 26a and 26b are spaced away from the capstan shafts 63a and 63b, respectively, and the tape feeding motor 59 is stopped to stop the reel receivers 76a and 76b.

Figure 14:
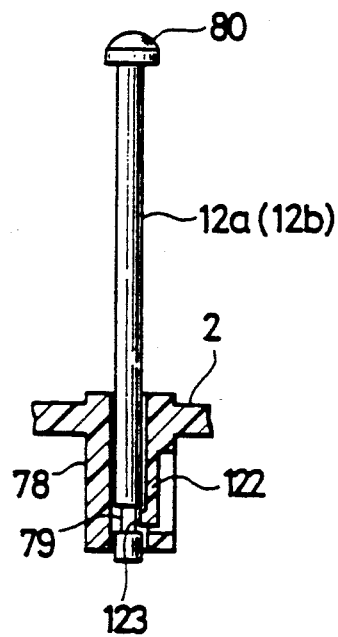
FIG. 14 is a modified coming off preventing member.
Figure 16:
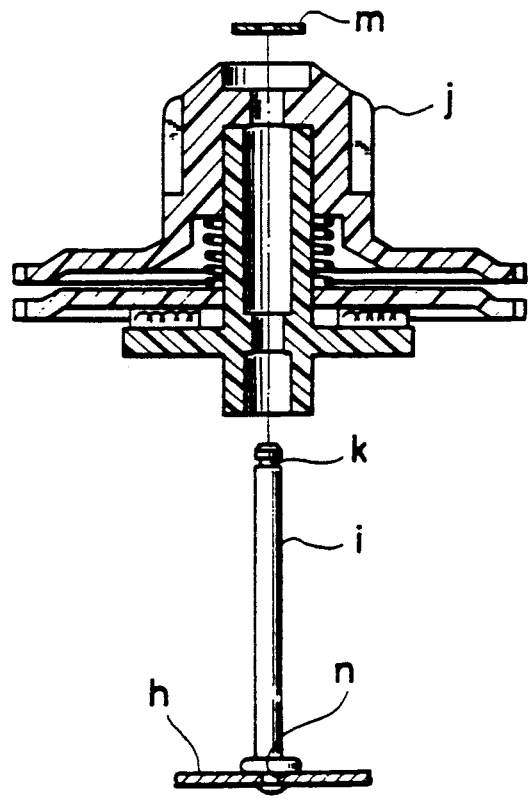
FIG. 16 is an axial sectional view showing a conventional reel receiver mounting mechanism in a partly disassembled condition.

It is to be noted that while the coming off preventing member 15 for engaging with the coming off preventing member receiving groove 79 of the reel shaft 12a or 12b is described constituted from a washer in the arrangement shown in FIG. 8, it may be replaced by a different coming off preventing member. In particular, referring to FIG. 14, such coming off preventing member is constituted from a resilient piece 122 formed in an integral relationship at a portion of a circumferential wall of a cylindrical shaft supporting portion 78 of a main base plate 2 and having a lateral engaging projection 123 at a lower end thereof. In this instance, when one end portion of a reel shaft 12a or 12b is fitted into the shaft supporting portion 78, the engaging projection 123 of the resilient piece 122 is automatically resiliently snapped into a coming off preventing member receiving groove 79 of the reel shaft 12a or 12b. Accordingly, the reel shaft 12a or 12b can be mounted in position readily. Besides, since the coming off preventing member is formed in an integral relationship with the shaft supporting portion 78, it can be formed very readily.

I claim:

1. An automatic reversing tape recorder apparatus having a magnetic head, comprising:

a base plate, said base plate including a main base plate formed of a synthetic resin material, said main base plate being held between and integral to first and second auxiliary base plates each made of a metal material;

a pair of reel receivers disposed on said base plate, each of said reel receivers having a reel gear provide at a lower end portion thereof;

a pair of capstans selectively connected to said reel gears via a pair of fixed speed rotation transmitting gears or a pair of high speed rotation transmitting gears which transmit rotation of said capstans to said respective reel gears;

a pair of pinch roller supporting members each having a pinch roller supported for rotation thereon;

a pair of upright support shafts disposed on said first auxiliary base plate, each of said support shafts supporting a corresponding one of said pinch roller supporting members for pivotal motion thereon;

a plate-formed operating lever for operation of said tape recorder at a fixed speed operatively coupled to said magnetic head for moving said magnetic head to a tape reproducing position;

a pair of plate-formed operation levers for operation of said tape recorder at a high speed and a plate-formed stopping operating lever supported for back and forth movement with respect to the main base plate;

a tape feeding direction reversing plate operatively coupled to said first auxiliary plate for reversing the tape feeding direction; and at least one spacing formed in said main base plate for accommodating said reel gears, said fixed speed rotation transmitting gears and said high speed rotation transmitting gears.

2. An automatic reversing tape recorder as claimed in claim 1, wherein said at least one spacing for accommodating said fixed rotation transmitting gears and said high speed rotation transmitting gears therein are openings formed in and extending through said main base plate.

* * * * *